United States Patent [19]

Ward

[11] Patent Number: 5,177,337

[45] Date of Patent: Jan. 5, 1993

[54] WELDING GUN ASSEMBLY AND FLUID ACTUATED CYLINDER

[75] Inventor: Allan Ward, Wimborne, Great Britain

[73] Assignee: Savair Limited, Dorset, United Kingdom

[21] Appl. No.: 603,012

[22] Filed: Oct. 25, 1990

[51] Int. Cl.⁵ .......................... B23K 9/28; B66F 3/24
[52] U.S. Cl. .................................... 219/89; 254/93 R
[58] Field of Search ....................... 219/89; 254/93 R

[56] References Cited

U.S. PATENT DOCUMENTS

| | | | |
|---|---|---|---|
| 1,779,365 | 10/1930 | Von Henke | 219/89 |
| 2,232,038 | 2/1941 | Stone et al. | 219/89 |
| 3,958,098 | 5/1976 | Iizuka et al. | 254/93 R X |
| 4,517,435 | 5/1985 | Humblot | 219/89 |

Primary Examiner—Marvin M. Lateef
Attorney, Agent, or Firm—Remy J. VanOphem

[57] ABSTRACT

An apparatus for applying a force to a workpiece as required in welding or clamping. The apparatus applies a force to the workpiece through a direct clamping action or through link enhanced scissor type action that increases the mechanical force supplied by a fluid driven cylinder. The fluid driven cylinder has piston rods at both ends of an elongated external housing. The fluid driven cylinder is supported at one end by an attachment to the end of one piston rod and is supported at the other end by an attachment to the external housing. A plurality of pistons permit the piston rods to move relative to one another and also relative to the external housing. The entire fluid driven cylinder can rotate and translate.

38 Claims, 9 Drawing Sheets

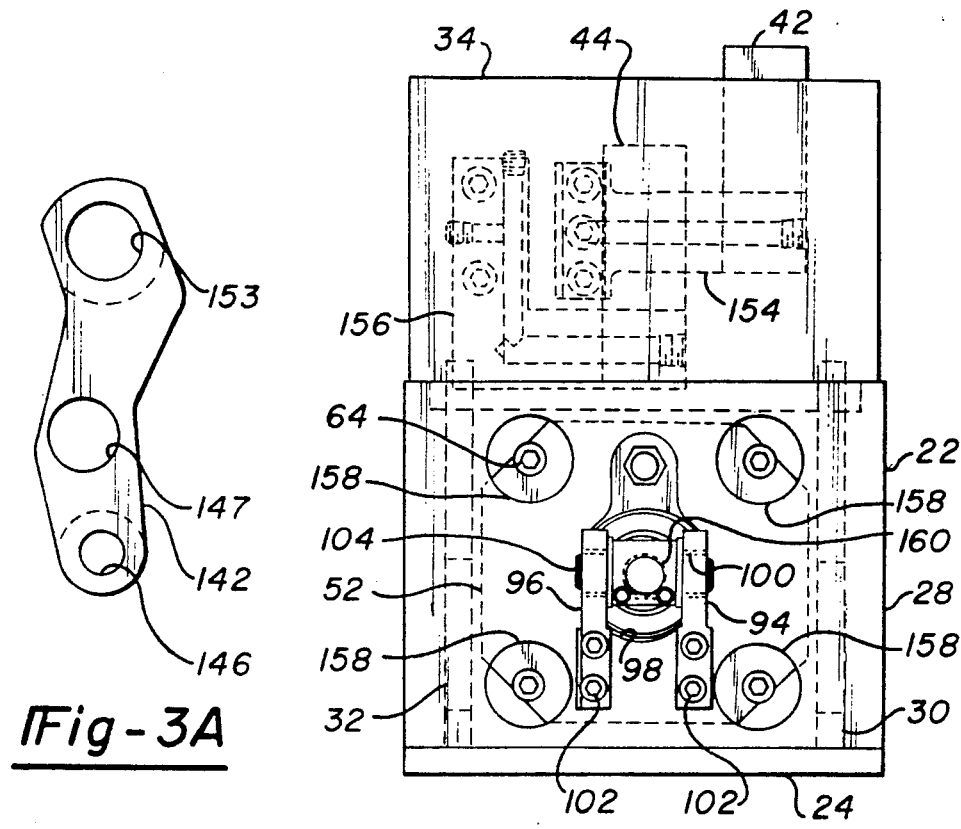
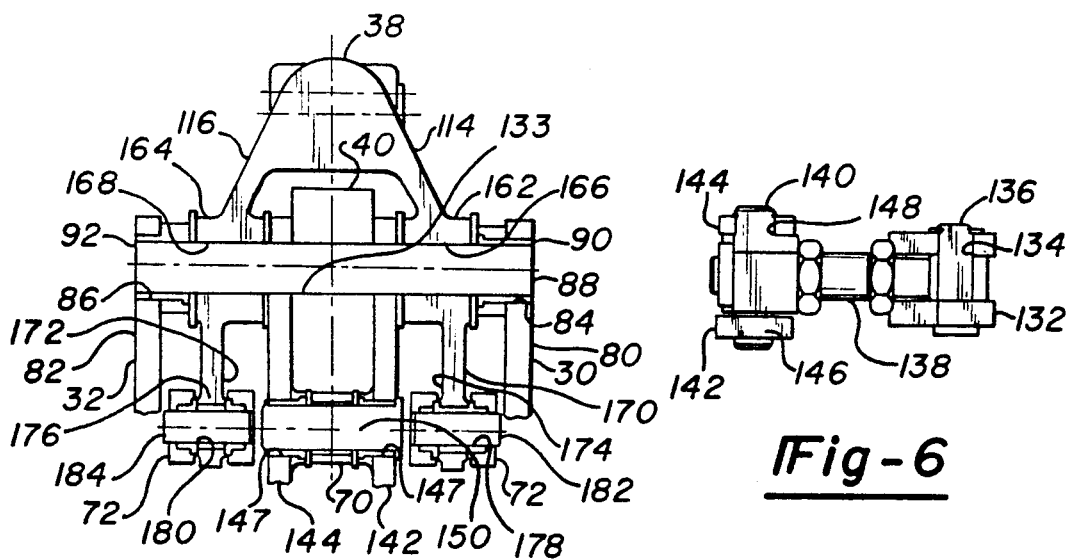

WELDING GUN ASSEMBLY AND FLUID ACTUATED CYLINDER

BACKGROUND OF THE INVENTION

1. Field of the Invention

The present invention relates to an apparatus for performing spot welds wherein the apparatus is actuated by a fluid driven cylinder having an external housing that can float with respect to a plurality of pistons contained within the external housing.

2. Description of the Prior Art

The prior art discloses a variety of welding devices that employ a fluid driven cylinder to move electrodes into and out of engagement with a workpiece. In general, most of the prior art welding assembly devices utilize, in conjunction with a single fluid driven cylinder, steel springs in order to balance or equalize the electrodes about the workpiece. Some prior art devices attempt to balance the electrodes about the workpiece by using two fluid driven cylinders to operate the welding gun assembly. Whether one cylinder with springs or two cylinders are used to equalize the gun, most of these prior art devices mount the body of the fluid driven cylinder about a fixed pivot point, while the rod is attached to a movable pivot point. The resulting arrangement causes the body of the cylinder to oscillate through a relatively large angular sector, therefore requiring that the cylinder be mounted a fair distance from the transformer or any other fixture component to permit the cylinder to oscillate substantially without interfering with any other component mounted on the welding gun fixture assembly. In general, most of the prior art devices utilize a fluid driven cylinder in which the external housing is fixed against axial movement. Such devices rely upon internally positioned pistons and attached piston rods to move relative to the fixed position external housing.

The present invention differs from the welding gun that is shown and described in U.S. Pat. No. 3,008,033 entitled "Welding Gun" issued Nov. 7, 1961, to Charles Senn. FIG. 1 of the Senn patent depicts a pair of cylinders, one within the other in telescoped fashion. The external cylinder has an end closure with a threaded extension for securing the welding gun in a fixed position. The internal cylinder houses a fixed position piston with an accompanying fixed position piston rod that is attached to the end closure of the external cylinder. One end closure of the internal cylinder is in the form of an apertured piston that slides on the fixed position piston rod. The other end of the internal cylinder protrudes from the external cylinder and has attached thereto welding electrodes. By regulating the fluid pressure on either side of the apertured sliding piston and the fixed piston, the internal cylinder can be programmed to move toward and away from a workpiece that is to be welded.

The present invention differs from the above described device in that the external housing of the fluid driven cylinder is capable of controlled movement under the influence of internally positioned pistons.

In U.S. Pat. No. 4,137,828 entitled "Welding Gun" issued Feb. 6, 1979, also to Charles Senn, there is shown a welding apparatus capable of delivering a heavy axial load such as that required for welding concrete reinforcing steel. The welding apparatus utilizes inner and outer telescoped cylindrical members. The external housing is fixed against axial movement and contains an internal cylinder to which welding electrodes are attached. The internal cylinder has an apertured end closure that serves as a piston. A piston rod fixed to and cantilevered from the attached end of the external cylinder passes through the apertured end closure of the internal cylinder. The piston rod contains two spaced apart pistons attached thereto. The internal cylinder contains a fixed position bulkhead that is positioned between the pair of spaced apart pistons. The bulkhead has an axially located aperture through which the piston rod can move relative thereto. The internal cylinder is driven from within the external cylinder under the influence of three air chambers to which air pressure is applied simultaneously. The return stroke of the internal cylinder is controlled by the application of air pressure to a fourth pressure chamber.

While the present invention does use the fixed bulkhead concept in one embodiment, there is no telescoping cylinder arrangement nor is the housing containing the pistons of the fluid driven cylinder fixed with respect to the workpiece.

In U.S. Pat. No. 4,684,778 entitled "Resistance Spot Welding Gun and Transformer Assembly" issued Aug. 4, 1987, to Dimitrios G. Cecil, there is shown and described a spot welding assembly that includes a transformer fixed base and a sliding cylinder mounted thereon. As shown in FIG. 5 of this patent, the sliding cylinder has a closed end and a centrally positioned apertured bulkhead therein. A piston rod is trained through an apertured end closure of the sliding cylinder. The piston rod has dual pistons attached thereto that lie in chambers on either side of the bulkhead that is attached to the sliding cylinder. The piston rod extends when air pressure is introduced between the closed end of the sliding cylinder and the piston located immediately adjacent thereto. The piston rod retracts when air pressure is introduced to the chamber between the bulkhead and the aforesaid piston. Thus, there is axial movement of the piston in one direction and a reaction movement of the sliding cylinder in the other direction. Welding electrodes are attached, respectively, to the free end of the piston and a cantilevered U-shaped arm attached to the sliding cylinder. The above described device permits welding electrodes to be biased in opposed directions toward a workpiece.

U.S. Pat. No. 3,732,784 entitled "Sequentially Operated Linear Actuator" issued May 15, 1973, to Robert A. Vogelei, et al depicts an actuator device that employs two cylinder rods that are in axial alignment and protrude from opposite ends of an external cylindrical housing. The external housing is not adapted for the containment of pressure.

What is lacking in the prior art is a pincher welding gun assembly which utilizes a single fluid driven cylinder without springs, yet provides equalization of the electrodes about the workpiece and also restricts movement of the fluid driven cylinder to allow a compact, lightweight design and assembly of a pincher gun welding assembly.

SUMMARY OF THE INVENTION

The present invention is a dual action fluid actuated apparatus for use in any application where a generally linear equal and opposite compressive or tensile force is applied to a workpiece such as for example in welding, forming, and piercing applications.

The invention is particularly adaptable for use in automated machines such as computer controlled robots. When such automated systems are utilized, it is important that the machine operate in a repetitive manner with little or no malfunction occurring. In order to describe the present invention, it will be placed in a welding environment.

The apparatus includes a compact support framework to which an electrical transformer is attached. A fluid driven cylinder is mounted in very close proximity to the transformer. The fluid driven cylinder has a piston rod extending from one end of the housing which is coupled to the support framework while a second piston rod extends from an opposite end which is attached to a pair of movable electrode carrying arms. Relative movement between the cylinder housing and the piston rods contained therein cause link and bell crank coupled electrode arms to move into and out of engagement with a workpiece while providing the appropriate equalizing feature as well as a midpoint stability of the electrodes. The fluid driven cylinder is mounted at one end to a fixed point on the support framework and at an opposite end to a moving pivot associated with the electrode arms which significantly limits the movement of the cylinder thereby permitting the cylinder housing to be mounted in very close proximity to the fixture weldments and/or transformer mounting, resulting in a more compact arrangement of a pincher type welding gun assembly.

Another embodiment of the present invention utilizes a floating piston that is positioned in contact with one of the piston rods. The floating piston enables more accurate equalizing pressure control between the electrodes that are coupled thereto.

An additional embodiment of the invention encompasses not only the floating piston but, also, a fixed bulkhead contained within the cylinder body and a pair of pistons that are positioned on either side of the bulkhead and attached to a common piston rod. The dual pistons connected to a common piston rod provide for an amplified power output.

A primary object of the present invention is to provide a force generating multi-action apparatus that is compact and can function with a variety of tools attached thereto.

Another object of the present invention is to provide a fluid driven apparatus over which the movement thereof can be accurately controlled.

A further object of the present invention is to provide a fluid driven cylinder that can move relative to the axial movement of piston rods contained therein.

Another object of the present invention is to reduce the distance between the transformer and the fluid driven cylinder.

Still another object of the present invention is to produce a nearly balanced loading on the workpiece.

A further object of the present invention is to utilize a fluid driven cylinder that provides limited pivoting movement to permit the cylinder to be mounted near the transformer, resulting in a more compact assembly Another object of the present invention is to provide a welding apparatus that can be hydraulically driven into contact with the workpiece as well as hydraulically driven away therefrom.

An additional object of the present invention is to provide midpoint rigidity to the movement of the electrodes attached to the apparatus.

A yet further object of the present invention is to provide forward and rear piston rods with pinned connections.

Further objects and advantages of the present invention will become apparent from the following description and the appended claims, reference being made to the accompanying drawings forming a part of this specification, wherein like reference characters designate corresponding parts in the several views.

BRIEF DESCRIPTION OF THE DRAWINGS

FIG. 3A is a side view of a yoke link associated with the lower yoke as shown in FIG. 3;

FIG. 4 is an elevational end view facing the left-hand side of FIG. 3;

FIG. 5 is a cross-sectional view taken along line 5—5 of FIG. 3;

FIG. 6 is a cross-sectional view taken along line 6—6 of FIG. 3;

DETAILED DESCRIPTION OF THE PREFERRED EMBODIMENT

Figure 1:
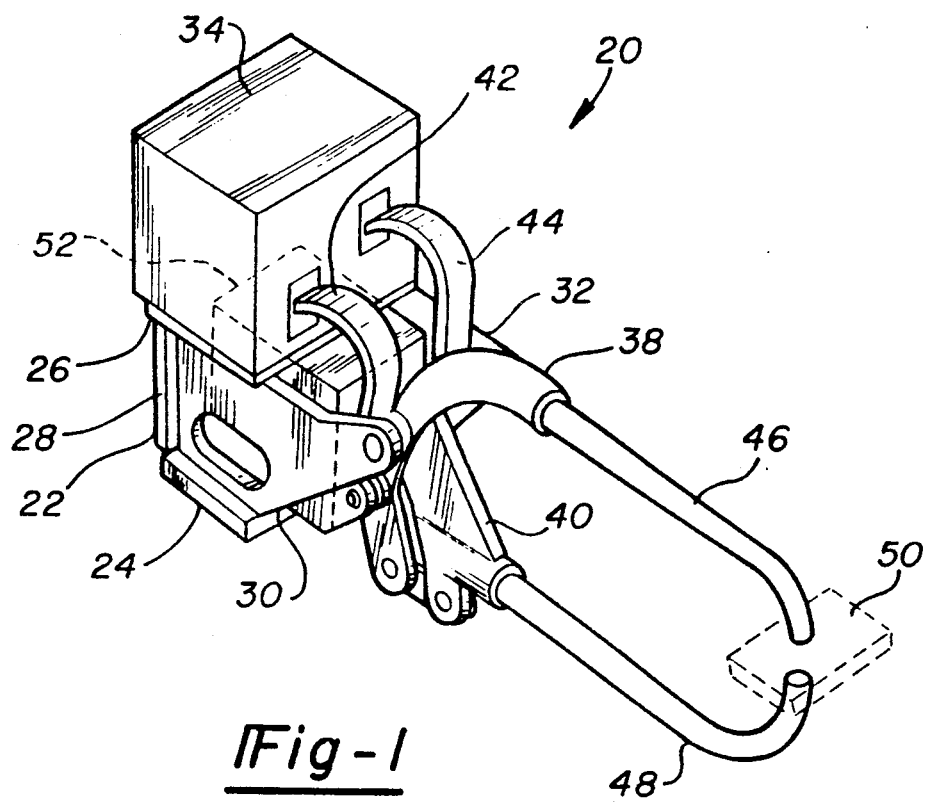
FIG. 1 is a perspective view that shows the apparatus of the present invention in a welding environment.

Referring now to the drawings and more particularly to FIG. 1, there is illustrated in perspective an apparatus of the present invention in the form of an electrical spot welder. The tool shown in FIG. 1 is adapted particularly for attachment to the arm of an industrial robot that would find use in industry such as automobile assembly lines.

Figure 3:
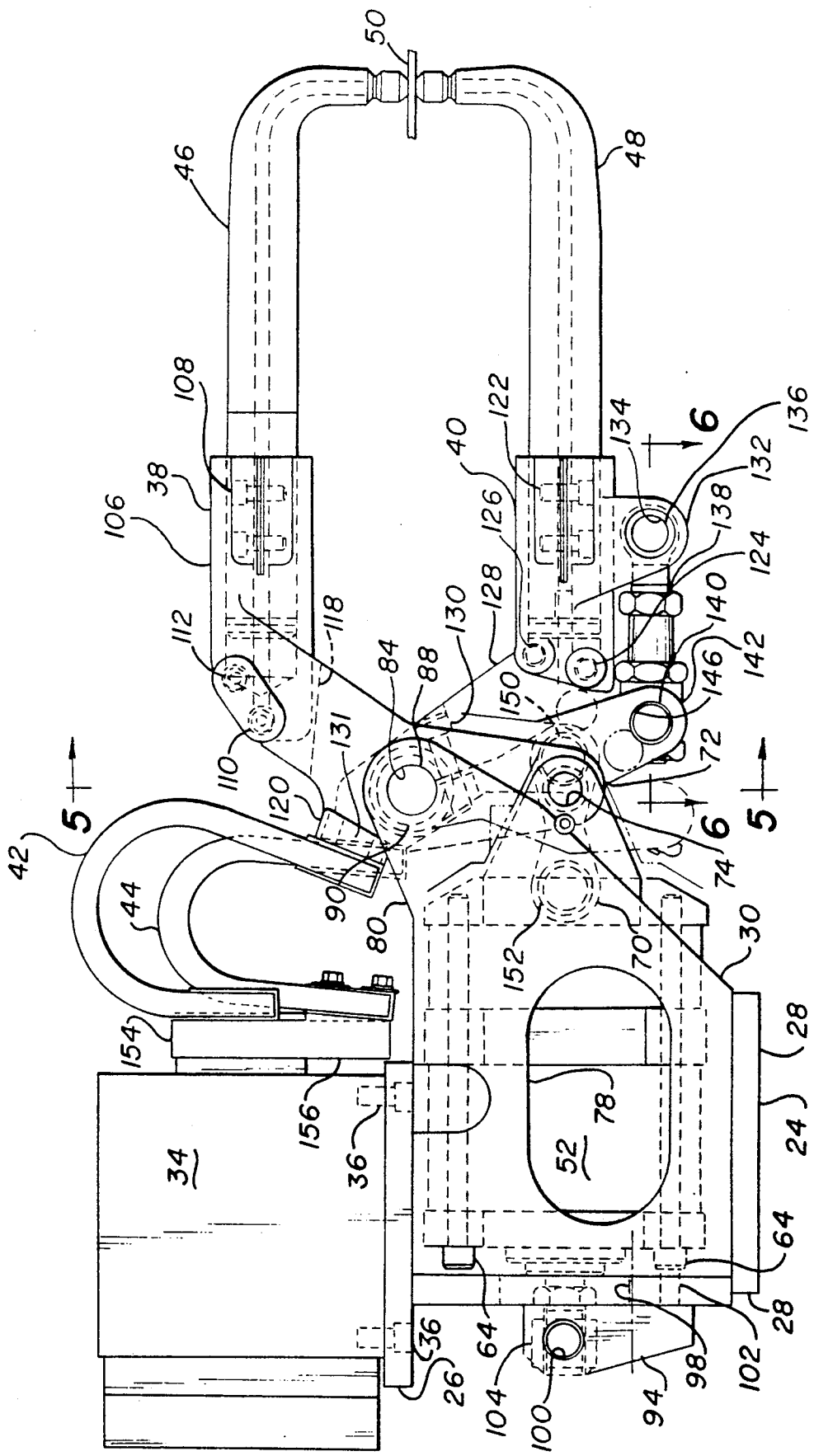
FIG. 3 is a side elevational view that shows an electrical transformer mounted in close proximity to a fluid driven cylinder.

With reference to FIG. 1, the overall apparatus is represented by the numeral 20. A box-like cradle or frame support structure 22 is assembled by welding or in the alternate with bolts. The support structure 22 has a bottom plate 24 and a top plate 26 that are positioned in generally parallel relationship to one another. A back plate 28 is positioned between the top plate 26 and the bottom plate 24. Spaced apart side plates 30 and 32 are attached to the bottom plate 24 and the back plate 28. An electrical transformer 34 is attached to the top plate 26 by a plurality of bolts 36, as best seen in FIG. 3. The electrical transformer 34 can, by way of example, be a 32 KVA transformer that operates on a single phase 440 volt, 50–60 hertz input which is coupled to the primary coil of the transformer 34. The overall apparatus 20 has an upper yoke 38 and a lower yoke 40 to which a pair of shunts 42 and 44 are, respectively, attached. The shunts 42 and 44, similar to the upper and lower yokes 38 and 40, are constructed from a good electrical conductor such as copper. Since the shunts 42 and 44 are required to undergo repetitive flexing, they are essentially U-shaped leaf springs each consisting of a plurality of very thin copper sheets. The shunts 42 and 44 are, of course, attached to the secondary output terminals of the electrical transformer 34. The upper yoke 38 has attached thereto an elongate electrode 46, and a similar elongate electrode 48 is attached to the lower yoke 40. The electrodes 46 and 48 are curved at their terminal ends so that they can contact opposing faces of a workpiece 50. The electrodes 46 and 48 are hollow in construction to permit the ingress and egress of a cooling fluid such as water. The upper and lower yokes 38 and 40 are actuated by a fluid driven cylinder 52 that is positioned within the support structure 22. A brief description of the fluid driven cylinder 52 is set forth immediately below.

Figure 2:
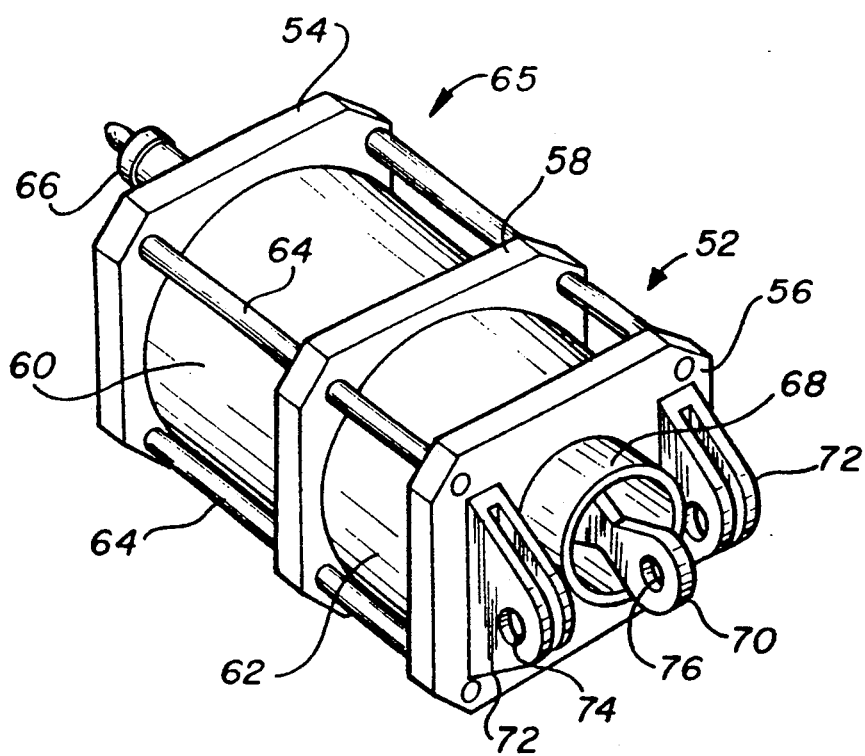
FIG. 2 is a perspective view of a fluid driven cylinder that provides the mechanical power for the apparatus shown in FIG. 1.

FIG. 2 is a perspective view of the fluid driven cylinder 52 that provides mechanical power for the overall apparatus 20. The fluid driven cylinder 52 has a rear cylinder head 54 and a front cylinder head 56 that are in spaced apart parallel orientation. A bulkhead 58 is positioned between the rear and front cylinder heads 54 and 56. A rear cylinder body 60 is positioned between the rear cylinder head 54 and the bulkhead 58. In a similar manner, and in axial alignment therewith, a front cylinder body 62 is positioned between the bulkhead 58 and the front cylinder head 56. The front and rear cylinder heads 56 and 54, the bulkhead 58, and the front and rear cylinder bodies 62 and 60 are coupled together by a plurality of tie rods 64 that pass through apertures in the rear cylinder head 54 and the bulkhead 58 and are anchored in the front cylinder head 56 by a threaded engagement. The assembly of the just mentioned parts of the fluid driven cylinder 52 forms an external housing 65. A reaction piston rod 66 is shown as it extends outside of the rear cylinder head 54. The reaction piston rod 66 is in axial alignment with the longitudinal axis of the fluid driven cylinder 52. The reaction piston rod 66 and a front piston rod 68 have longitudinal axes that are coincident with each other. A double apertured link 70 is attached to the free end of the front piston rod 68. A clevis 72 with an aperture 74 through the legs thereof is positioned on each side of the front piston rod 68. The details of the fluid driven cylinder 52 will be explained more fully below.

FIG. 3 is a side elevational view that shows the electrical transformer 34 mounted immediately above the fluid driven cylinder 52 to maintain a compact assembly. The transformer 34 is attached to the top plate 26 by a plurality of bolts 36. As best seen in FIG. 5, the side plates 30 and 32 are of symmetrical configuration and each contain an elliptical aperture 78 that permits access to the fluid driven cylinder 52 which is contained within the support structure 22. The side plates 30 and 32 have cantilevered support arms 80 and 82 that extend in a forward and upward direction. The support arms 80 and 82 have bores 84 and 86 that are in axial alignment with each other. A pivot pin 88 is supported within a pair of flange bearings 90 and 92 which are installed in the bores 84 and 86. The pivot pin 88 and its function will be discussed in more detail below.

The back plate 28 of the support structure 22 has a pair of spaced apart brackets 94 and 96 that are positioned on each side of a centrally located aperture 98 in the back plate 28, as shown in FIG. 4, and the brackets 94 and 96 are attached to the back plate 28 by a series of bolts 102. The brackets 94 and 96 each contain a bore 100 which are in axial alignment with each other and into which a pivot block 104 is journaled. The pivot block 104 provides the sole support for the rear portion of the fluid driven cylinder 52.

Attention is now directed to the upper yoke 38 which supports the electrode 46. An upper yoke end 106 contains a clamp arrangement for the immobilization of the electrode 46. Bolts 108 provide the clamping force necessary for complete immobilization of the electrode 46. The upper yoke 38 is partially cored for the conveyance of a cooling fluid such as water therethrough. A fluid ingress port 110 is in communication with the interior of the electrode 46. A fluid egress port 112 receives the outflow of the cooling fluid from the electrode 46. The upper yoke 38 is bifurcated into two widely spread apart legs 114 and 116, as best seen in FIG. 5. The apex of the bifurcation occurs at approximately the broken line 118, as shown in FIG. 3. The upper yoke 38 has a boss 120 that serves as the attachment point for the shunt 42.

The lower yoke 40 has a clamp arrangement for securing the electrode 48. Bolts 122 generate the clamping force necessary for the containment of the electrode 48. The lower yoke 40 has a fluid ingress port 124 that is in communication with the interior of the electrode 48 and the outflow of the cooling fluid passes through a fluid egress port 126. The lower yoke 40 has an upwardly extending arm 128 that is clamped to the pivot pin by a bolt 130 and has a boss 131 to which the shunt 44 is attached. A bore 133 passes through the upwardly extending arm 128 as shown in FIG. 5. The lower yoke 40 has a downwardly extending clevis 132 adjacent to the electrode 48 which has a bore 134 through both legs thereof for the accommodation of a pin 136. An adjustable rod 138 is retained at one end by the pin 136 and at the opposite end the adjustable rod 138 is retained by a pin 140 that is coupled to the lower ends of spaced apart yoke links 142 and 144. The profile of the yoke link 142 can be seen in FIG. 3A. The pin 140 is created by two bosses machined cylindrically on a cube-shaped yoke through which passes the adjustable rod 138. The cylindrical bosses or pin 140 is journaled in a pair of bores 146 and 148 in the yoke links 142 and 144 and the yoke links 142 and 144 also have a centrally positioned bore 147 that accommodates a pin 150. The pin 150 also passes through an aperture 76 in the outboard end of the link 70 (shown in FIG. 7) which is attached to the front rod 68 of the fluid driven cylinder 52. The yoke links 142 and 144 have a bore 153 positioned at the top end to contain the pivot pin 88.

FIG. 4 is an elevational end view facing the left-hand side of FIG. 3. The shunts 42 and 44 are shown at the top of FIG. 3. A shunt adapter 154 connects the shunt 42 to the electrical transformer 34. In a similar manner, a shunt adapter 156 connects the shunt 44 to the electrical transformer 34. The back plate 28 of the support structure 22 contains the centrally positioned aperture 98 as well as four additional apertures 158 which permit access to the tie rods 64 and also provide weight reducing holes in the back plate 28. An appropriate access aperture (not shown) is also provided in the back plate to permit access to a fluid port or bore 310. The brackets 94 and 96 are anchored to the back plate 28 by the bolts 102. The pivot block 104 is journaled in the bores 100 and, as previously mentioned, provides the sole support for the rear portion of the fluid driven cylinder 52. The pivot block 104 contains a centrally located bore 160 that is in axial alignment with the longitudinal axis of the fluid driven cylinder 52.

FIG. 5 is a cross-sectional view taken along line 5—5 of FIG. 3 which shows the pivot pin 88 and the associated components that are journaled thereon. The pivot pin 88 is supported by the flange bearings 90 and 92 which are seated in the bores 84 and 86 of the side plates 30 and 32. The downwardly extending legs 114 and 116 of the upper yoke 38 have centrally positioned intermediate bosses 162 and 164 through which bores 166 and 168 are located. The bores 166 and 168 contain the pivot pin 88. The legs 114 and 116 also have lower extensions 170 and 172 which have end bosses 174 and 176 that accommodate bores 178 and 180. The bores 178 and 180 contain pins 182 and 184 that couple the end bosses 174 and 176 to the pair of clevises 72 that are attached to the front cylinder head 56 of the fluid driven cylinder 52. The pins 182 and 184 support the front half of the fluid driven cylinder 52.

FIG. 6 is a cross-sectional view taken along line 6—6 of FIG. 3 that shows the adjustable rod 138 and its end connections. The pin 140 is shown within the bores 146 and 148 of the yoke links 142 and 144. The bore 134 through both legs of the clevis 132 contains the pin 136.

Figure 7:
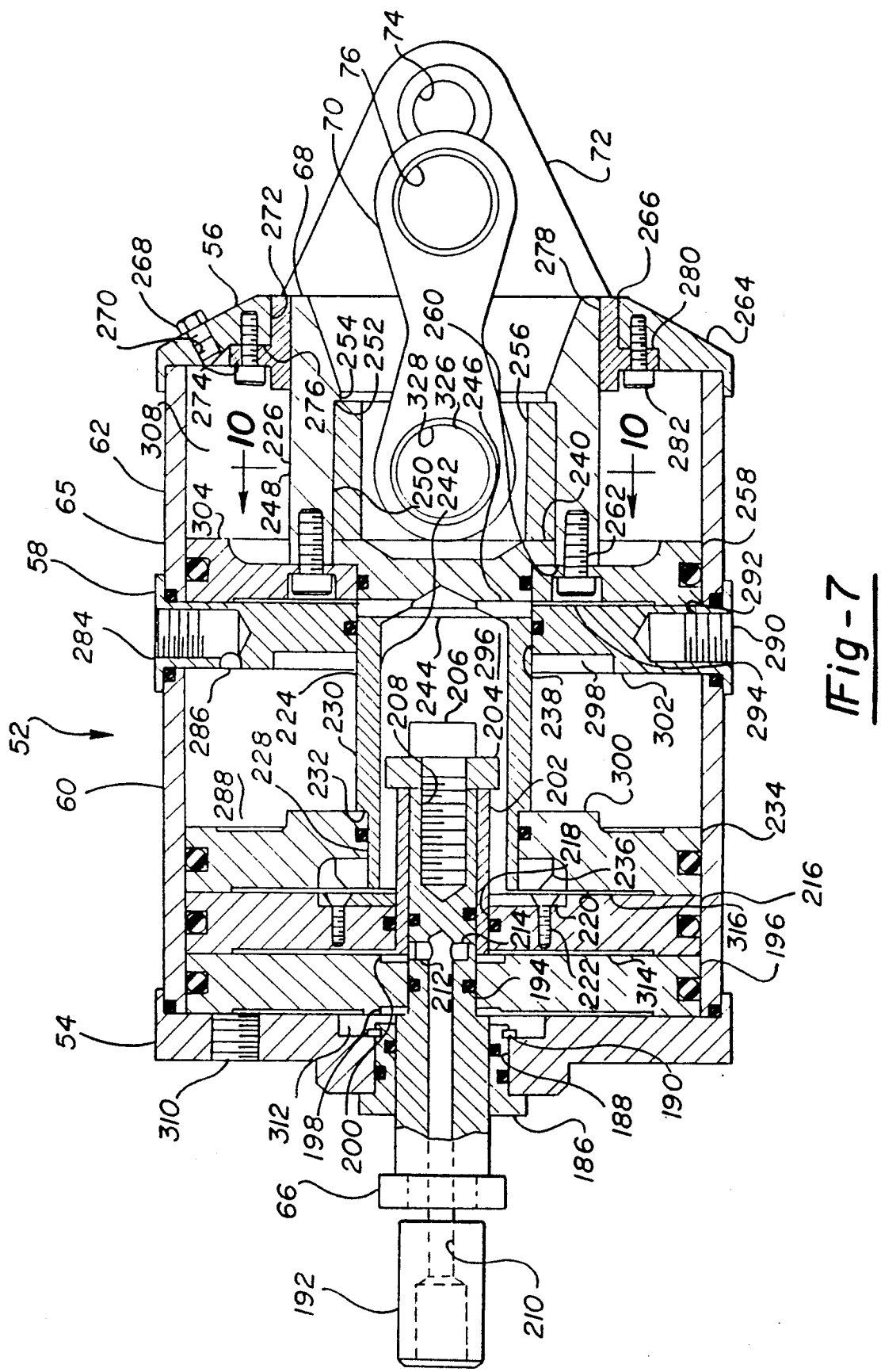
FIG. 7 is a cross-sectional side view taken axially through the fluid driven cylinder depicted in FIG. 2.

FIG. 7 is a cross-sectional side view of the fluid driven cylinder 52 taken axially through the cylinder which is shown in perspective in FIG. 2. The fluid driven cylinder 52 has the centrally positioned bulkhead 58 as well as the front and rear cylinder head 56 and 54 that are held in spaced relationship by the front and rear cylinder bodies 62 and 60. The rear cylinder head 54 has a cylinder head bearing 186 that is positioned in an axially aligned bore 188 and held in position by a retaining ring 190. The reaction piston rod 66 is threaded at its end 192 for engagement with the pivot block 104, as shown in FIG. 3. The reaction piston rod 66 has a reduced diameter section 194 that contains a reaction piston 196 flanked by washers 198 and 200. A sleeve 202 is placed over the reduced diameter section 194 in abutment with the washer 200. A piston stop 204 is placed in abutment against the ends of the reaction piston rod 66 and the sleeve 202. The reaction piston rod 66, the washers 198 and 200, the sleeve 202, and the piston stop 204 are locked together as a unit by the installation of a bolt 206 in a threaded bore 208 in the end of the reaction piston rod 66. The reaction piston rod 66 has an axially aligned bore 210 that commences at the threaded end 192 and ends at radially aligned bores 212 and 214. The sleeve 202 contains notches (not shown) at its end adjacent to the washer 200 so as not to impede access to the ends of the radially aligned bores 212 and 214. A floating piston 216 that contains an axially aligned bore 218 is positioned over the sleeve 202 so that it is in sliding engagement therewith. The floating piston 216 has an impact plate 220 attached to one face by a plurality of bolts 222.

The front piston rod 68 consists of a rear piston rod section 224 and a forward piston rod section 226. The rear piston rod section 224 has a partially threaded reduced diameter section 228 and an intermediate diameter section 230. A shoulder 232 is formed at the junction of the reduced and intermediate diameter sections 228 and 230. A rear piston 234 is positioned on the reduced diameter section 228 in abutting contact with the shoulder 232. A threaded nut 236 is engaged with the reduced diameter section 228 to lock the rear piston firmly into engagement with the shoulder 232. The intermediate diameter section 230 is trained through a bore 238 in the bulkhead 58. The front end, or right end as viewed in FIG. 7, of the rear piston rod section 224 terminates with a flange 240 of greater diameter than the intermediate diameter section 230. The rear piston rod section 224 contains a large axially aligned bore 242 that permits the piston stop 204 of the reaction piston rod 66 to move freely therein. Two radially aligned bores 244 and 246 are positioned in the intermediate diameter section 230 so that they intersect the axially aligned bore 242.

The forward piston rod section 226 is in the form of a sleeve with an external diameter 248. The forward piston rod section 226 has an internal bore 250 that terminates at its forward end with a shoulder 252 that is adjacent to a smaller diameter bore 254. A link adapter 256 is contained within the internal bore 250 with its forward end abutting the shoulder 252. The flange 240 of the rear piston rod section 224 fits into the internal bore 250 of the forward piston rod section 226 so that it is in contact with the link adapter 256. A forward piston 258 is positioned on the intermediate diameter section 230 of the rear piston rod section 224 adjacent to and in contact with the flange 240. The forward piston 258 is also in abutting relationship with an end 260 of the forward piston rod section 226. A series of bolts 262 are utilized to attach the forward piston 258 to the end 260 of the forward piston rod section 226. The installation of the bolts 262 firmly lock together the rear piston rod section 224, the forward piston rod section 226, the forward piston 258, and the link adapter 256.

The front cylinder head 56 consists of two parts, a retainer 264 and a piston rod bushing 266. The retainer 264 contains as an integral part thereof the two clevises 72 shown in FIG. 2. A vent 268 is threaded into a bore 270 that passes through the wall of the retainer 264. The retainer 264 also has an internal bore 272 that is in axial alignment with the overall apparatus 20. A slightly larger diameter bore 274 is positioned adjacent to the bore 272 and a radially disposed wall 276 interconnects the bores 272 and 274. The piston rod bushing 266 has an internal bore 278 through which the forward piston rod section 226 passes and also has a radially extending flange 280 that fits into abutment against the radially disposed wall 276 of the retainer 264. A plurality of circumferentially spaced apart bolts 282 clamp the retainer 264 and the piston rod busing 266 together.

Returning once again to the bulkhead 58, a partially threaded bore 284 is positioned in the exterior wall of the bulkhead 58. An intercepting bore 286 connects the bore 284 with a chamber 288. Another partially threaded bore 290 is positioned in the exterior wall of the bulkhead 58. An intercepting bore 292 connects the threaded bore 290 with a chamber 294 which is positioned between the forward face of the bulkhead 58 and the rear surface of the forward piston 258. The chamber 294 is in communication with a chamber 296 located in the intermediate diameter section 230 of the rear piston rod section 224 via the radially aligned bores 244 and 246. The bulkhead 58 contains a recess 298 to accommodate a boss 300 on the rear piston 234. This arrangement permits the rear piston 234 to move into close engagement with a rear wall 302 of the bulkhead 58. A forward wall 304 of the forward piston 258 and the front cylinder head 56 define a chamber 308.

The rear cylinder head 54 contains the threaded bore or fluid port 310 in the exterior wall thereof. The threaded bore is in communication with a chamber 312 which is positioned between the forward wall of the rear cylinder head 54 and the rear face of the reaction piston 196. The bore 210 and the radially aligned bores 212 and 214 are in communication with a chamber 314 that is positioned between the forward face of the reaction piston 196 and the rear face of the floating piston 216. An additional chamber 316 is positioned between the forward face of the floating piston 216 and the rear face of the rear piston 234. The chamber 316 is in direct communication with the chamber 296.

Figure 8:
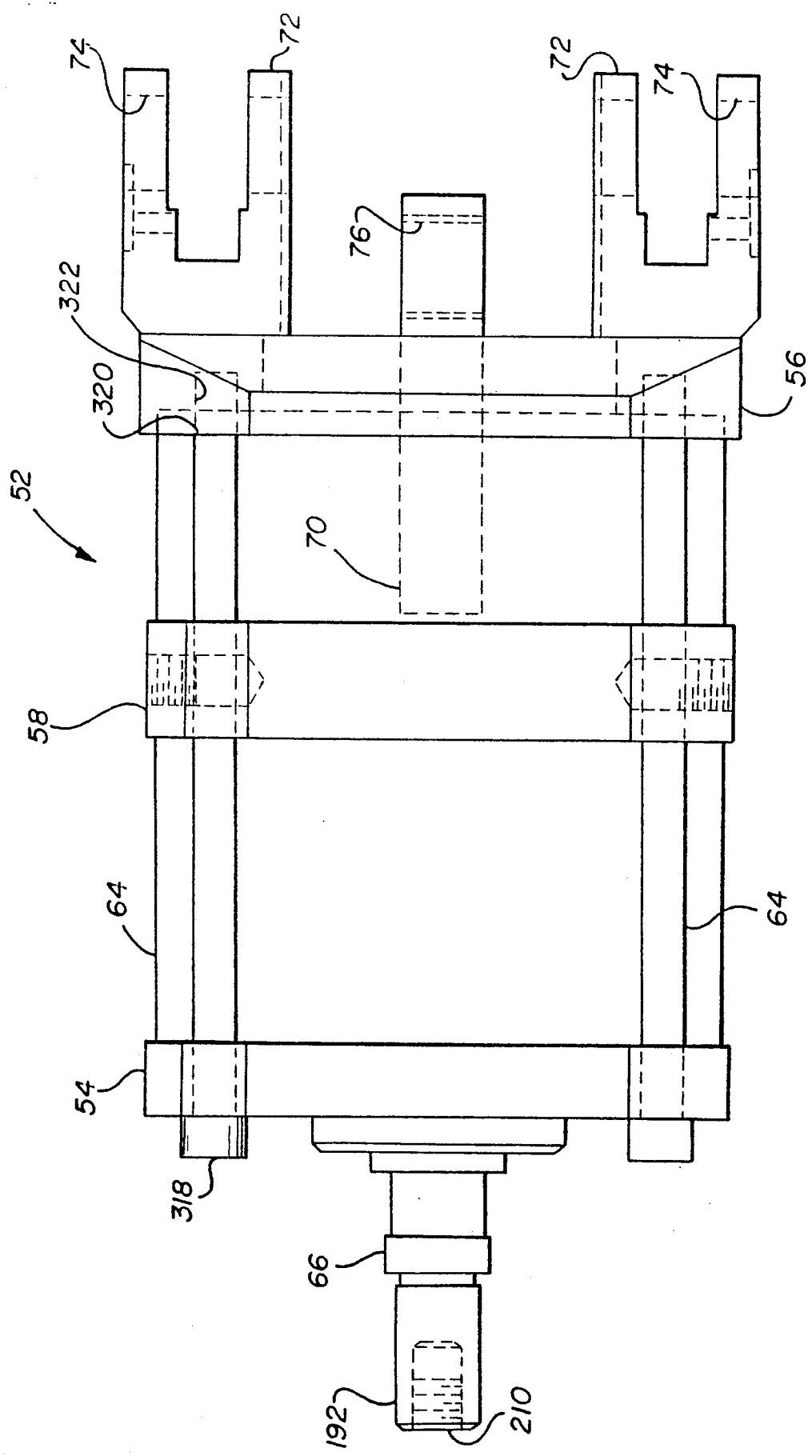
FIG. 8 is a top plan view of the fluid driven cylinder shown in FIGS. 2 and 7.

FIG. 8 is a top plan view of the fluid driven cylinder 52 which shows the tie rods 64 in a clamped position. The tie rod 64 has a wrenching head 318 adjacent the rear surface of the rear cylinder head 54. The opposite end of the tie rod 64 has a threaded end 320 that mates with a threaded bore 322 in the front cylinder head 56.

Figure 9:
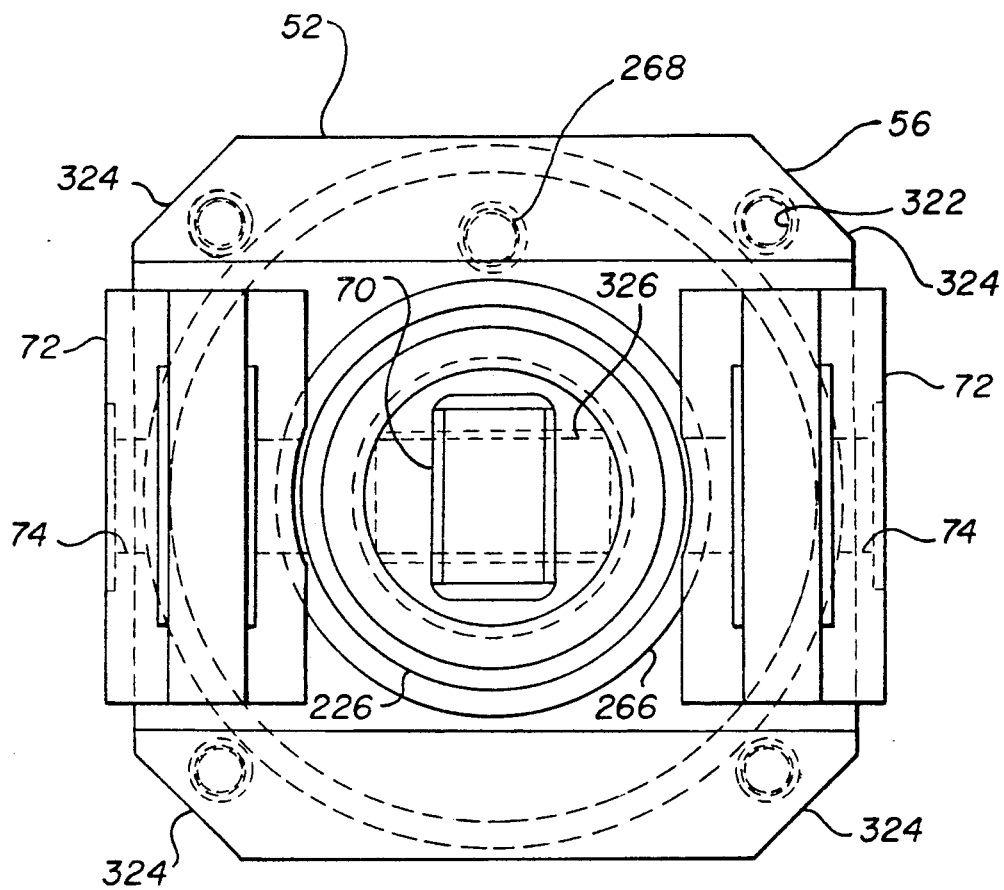
FIG. 9 is an elevational end view of the right-hand end of the fluid driven cylinder shown in FIGS. 2, 7 and 8.

FIG. 9 is an elevational view of the right-hand end of the fluid driven cylinder 52 shown in FIGS. 2, 7, and 8. Corners 324 of the rear cylinder head, the bulkhead 58, and the front cylinder head 56 are chamfered to reduce the weight of the overall fluid driven cylinder assembly. The link 70 is shown in the center of the forward piston rod section 226. A pin 326 is contained in the link adapter 256, as best seen in FIG. 7.

Figure 10:
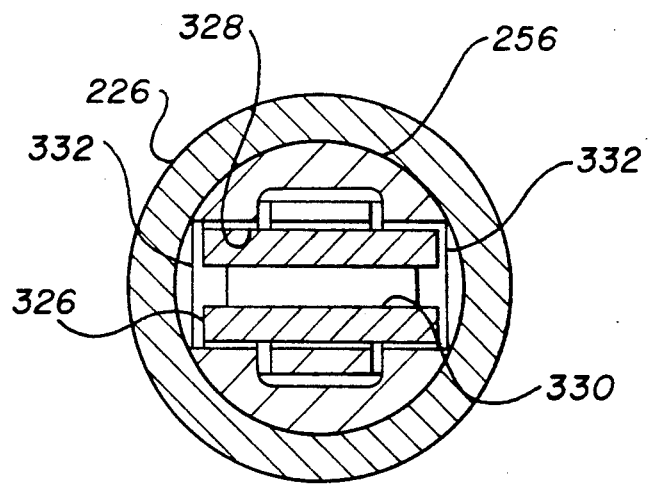
FIG. 10 is a cross-sectioned view taken along line 10—10 of FIG. 7.

FIG. 10 is a cross-sectioned view taken along line 10—10 of FIG. 7 which shows the forward piston rod section 226 and the link adapter 256. The pin 326 is contained in a bore 328 and the pin 326 has an axially extending bore 330 that contains insulating end caps 332.

Throughout the discussion and description of the invention presented above, it is assumed that those skilled in the art are aware that certain insulative materials have to be utilized between some adjacent components in order to assure the integrity of the electrical system. Also, seals such as O-rings have been shown but not individually identified.

ASSEMBLY AND OPERATION

The assembly of the present invention is very straightforward. The cylinder head bearing 186 is installed in the rear cylinder head 54. The reaction piston rod 66 is pushed through the cylinder head bearing 186. The reaction piston 196, the washers 198 and 200, the floating piston 216 with its impact plate 220, and the sleeve 202 are then placed in proper position on the reaction piston rod 66. The piston stop 204 is placed on the bolt 206 which is then threaded into the threaded bore 208 in the end of the reaction piston rod 66. The rear cylinder body 60 is then positioned over the reaction piston 196 and the floating piston 216. The above subassembly is then set aside.

A separate subassembly is made of the link 70, the pin 326, the link adapter 256, the front piston rod 68, the rear piston rod section 224 and the forward piston 258. This may be accomplished by aligning the link 70 with the bore 328 in the link adapter 256 and inserting the pin 326 to firmly attach the link 70 to the link adapter 256. The link adapter 256 with the link and pin installed is then inserted in the bore 250 of the front piston rod 68. The flange 240 of the rear piston rod section 224 is placed into abutting relationship with the end of the link adapter 256. The forward piston 258 is then pushed onto the intermediate diameter portion of the rear piston rod section 224 until it abuts the forward piston rod section 226 of the front piston rod 68 and then bolted in placed using the bolts 262. This separate subassembly is then mounted to the bulkhead 58 and the rear piston 234 by pushing the rear piston rod section 224 through the bulkhead 58 and thereafter mounting the forward piston 258 on the reduced diameter section 228 of the rear piston rod section and securing the rear piston thereto by way of the nut 236.

The previously set aside rear portion subassembly is then moved into axial alignment so that the front end of the reaction piston rod 66 enters the axially aligned bore 242 in the rear piston rod section 224. The tie rods 64 are then installed to hold the fluid driven cylinder 52 together as a working unit.

The assembled fluid driven cylinder 52 is positioned within the support structure 22. The pivot block 104 is installed on the threaded end 192 of the reaction piston rod 66. The brackets 94 and 96 are positioned on the ends of the pivot block 104 and then bolted to the back plate 28 with the bolts 102. The electrical transformer 34 is installed on the top plate 26 of the support structure 22 by the bolts 36. The pivot pin 88 is trained through the bores 84 and 86 of the support arms 80 and 82, the bores 166 and 168 in the upper yoke 38, the bores 153 in the yoke links 142 and 144, and the bore 133 in the upwardly extending arm 128 of the lower yoke 40. The lower yoke 40 is then clamped to the pivot pin 88 by the bolt 130. The pin 150 is then inserted through the bores 147 in the yoke links 142 and 144 and through the bore 152 in the link 70. The pins 182 and 184 are then inserted through the clevises 72 and the bores 178 and 180 of the upper yoke 38. The adjustable rod 138 is attached to both lower ends of the yoke links 142 and 144 with the pin 140. The other end of the adjustable rod 138 is then coupled to the clevis 132 on the lower yoke 40 with the pin 136. The shunt adapters 154 and 156 are then attached to the electrical transformer 34. The shunts 42 and 44 are coupled between the shunt adapters 154 and 156 and the respective shunts 42 and 44. The electrodes 46 and 48 are inserted into the upper and lower yokes 38 and 40. Fluid connections for cooling and operation, including additional electrical connections, may then be completed. After assembly, the fluid driven cylinder 52 is in an operating attitude, that is, it is completely suspended within the confinement of the support structure 22 but not in contact with it. The fluid driven cylinder 52 is pivotally supported at the rear entirely by the pivot block 104 and in the front the entire support is provided by the coupling to the upper yoke 38. Thus, the external housing 65 of the fluid driven cylinder 52 can translate and rotate relative to the surrounding support structure 22. Also, the external housing 65 can move relative to the reaction piston rod 66 and the front piston rod 68.

The present invention will work equally well with a scissor or bell crank system which has been described above, or with a linear system which will now be set forth during an explanation of the operation sequences of the embodiments of the invention.

Figure 11:
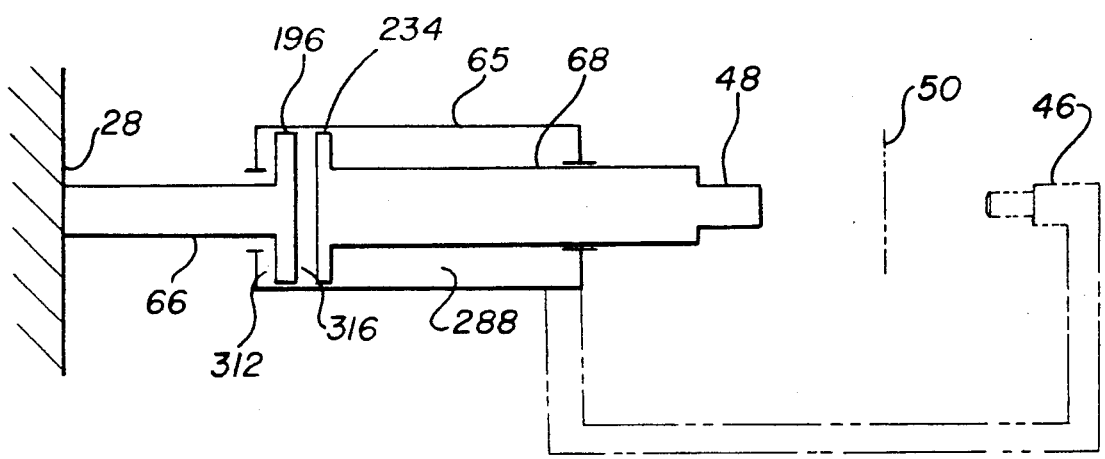
FIG. 11 is a schematic side view of a single stroke clamping and equalizing cylinder with attached electrodes in an open position.

FIG. 11 is a schematic side view of a single stroke clamping and equalizing cylinder with attached electrodes 46 and 48 in an open position with respect to a workpiece 50. Fluid pressure is applied to the chamber 312 causing the external housing 65 to move to the left, as viewed in FIG. 11, since the reaction piston rod 66 is held in fixed position. As the external housing 65 moves to the left, the electrode 46 approaches the workpiece 50. Fluid pressure is then introduced to the chamber 316, acting on the rear piston 234 which causes it to move to the right. As the rear piston 234 moves to the right, the front piston rod 68 advances the electrode 48 towards the workpiece 50 to clamp the workpiece.

Figure 12:
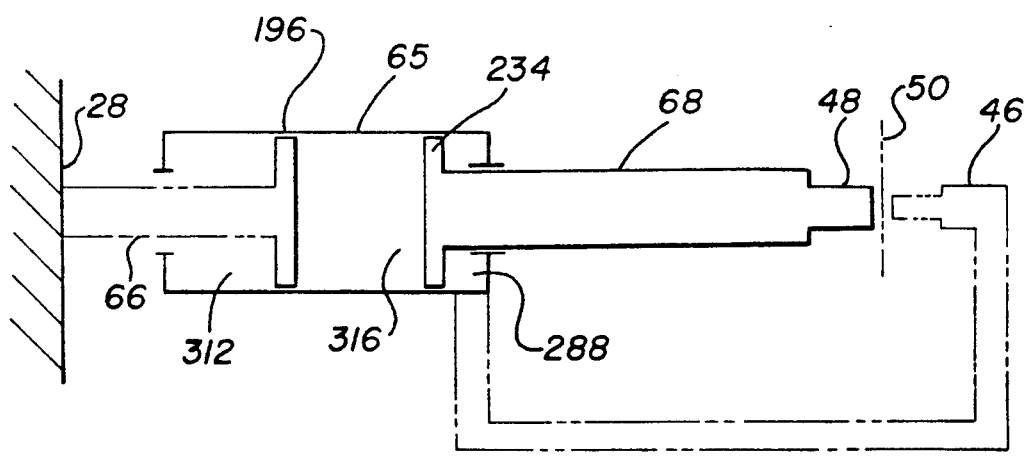
FIG. 12 is a schematic side view similar to that shown in FIG. 11 with the electrodes in a closed position.

FIG. 12 is a schematic side view which shows the electrodes 46 and 48 in a closed position with respect to the workpiece 50. Since the effective working area of the reaction piston 196, as it faces the chamber 312, is less than the area of the rear piston 234 area facing the chamber 316, the respective fluid pressures may have to be balanced so that undue force is not applied to the workpiece by either of the electrodes 46 or 48. After the weld sequence has been performed, the fluid pressure is released in the chambers 312 and 316 and fluid pressure is applied to the chamber 288. The pressure reaction against the face of the rear piston 234 causes the front piston rod 68 to move away from the workpiece 50. When the rear piston has moved its maximum distance to the left, the external housing 65 will move to the right, moving the electrode 48 away from the workpiece 50. The chamber 288 is vented as the robot is moved to its next work position to begin the next weld sequence and the weld cycle is ready to start again.

Figure 13:
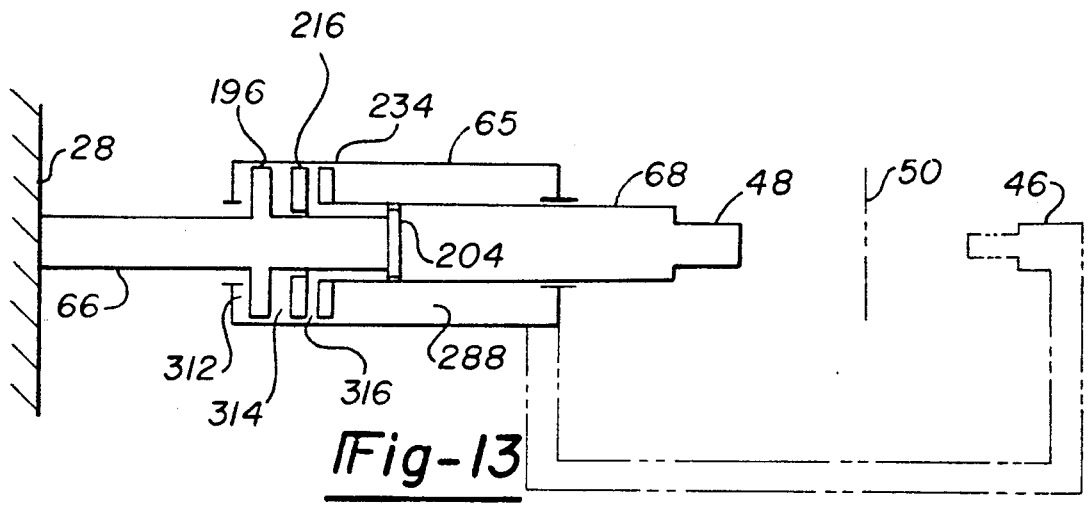
FIG. 13 is a schematic side view of a double stroke clamping and equalizing cylinder with attached electrodes in an open position.

FIG. 13 is a schematic side view of a second embodiment of the present invention which sets forth a double stroke clamping and equalizing cylinder which provides electrodes 46 and 48 in an open position with respect to the workpiece 50 as well as a midpoint position. In this embodiment of the invention, the floating piston 216 has been installed on the forward section of the reaction piston rod 66. During the initial start position, the electrodes 46 and 48 are at their maximum distance from the workpiece 50. Also, in the start position, as shown, the external housing 65 is advanced its maximum toward the right, as viewed in FIG. 13. The floating piston 216 and the rear piston 234 are in close proximity to the reaction piston 196.

Figure 14:
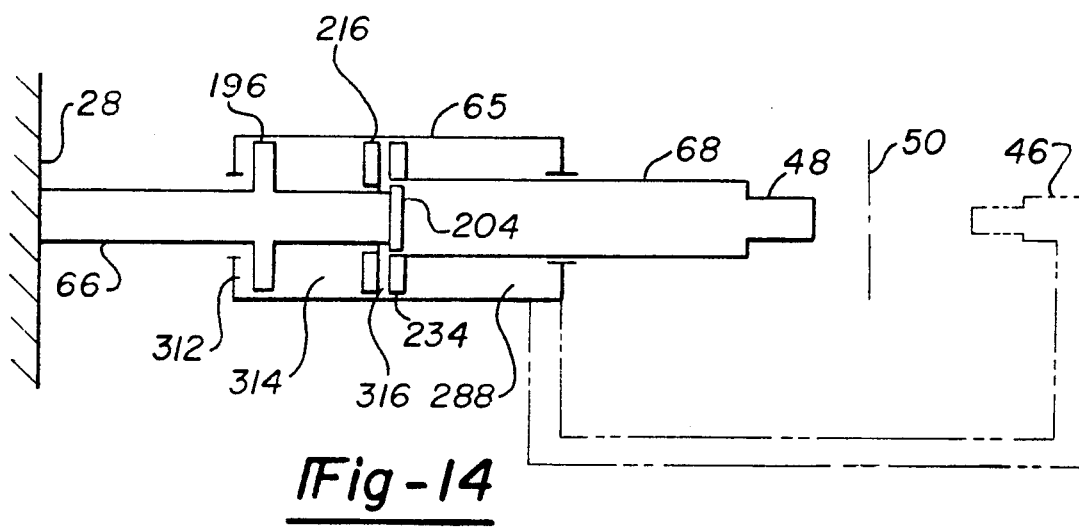
FIG. 14 is a schematic side view similar to that shown in FIG. 13 with the electrodes in an intermediate position.

FIG. 14 is a schematic side view similar to that shown in FIG. 13 except that the electrode 48 has moved to an intermediate position toward the workpiece 50. Fluid pressure is applied to the chamber 314, moving the floating piston 216 into abutting relationship with the rear piston 234. The floating piston 216 and the rear piston 234 move in unison toward the right until the floating piston 216 reaches its stop position against the piston stop 204. The advancement of the rear piston 234 to the right carries the electrode 48 to an intermediate position with respect to the workpiece 50.

Figure 15:
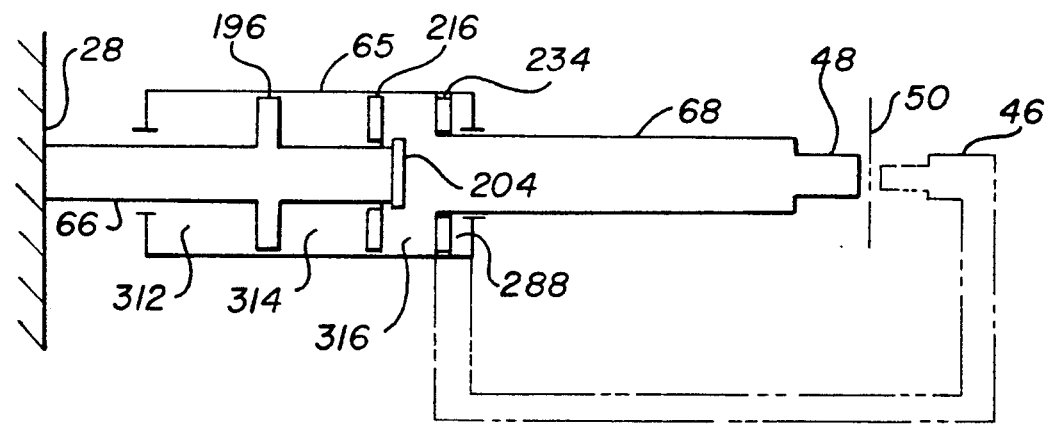
FIG. 15 is a schematic side view similar to that shown in FIGS. 13 and 14 with the electrodes in a closed position.

FIG. 15 is a schematic side view that shows the electrodes 46 and 48 in contact with the workpiece 50. To arrive at this position from the intermediate position set forth above, the fluid pressure in the chamber 288 is exhausted and maintained in the chamber 314. Fluid pressure is then applied to the chambers 312 and 316. The rear piston 234 moves to the right causing the electrode 48 to contact the workpiece 50. At the same time, the external housing 65 moves to the left bringing the electrode into contact with the workpiece 50. After the weld has been performed on the workpiece 50, the electrodes 46 and 48 can be returned to the intermediate position by releasing the fluid pressure in the chambers 312 and 316, and by applying fluid pressure to the chamber 288 which causes the rear piston 234 to move to the left and the external housing 65 to move to the right. The electrodes 46 and 48 can be moved to the fully open, or start position, by venting the fluid pressure from the chamber 314.

Figure 16:
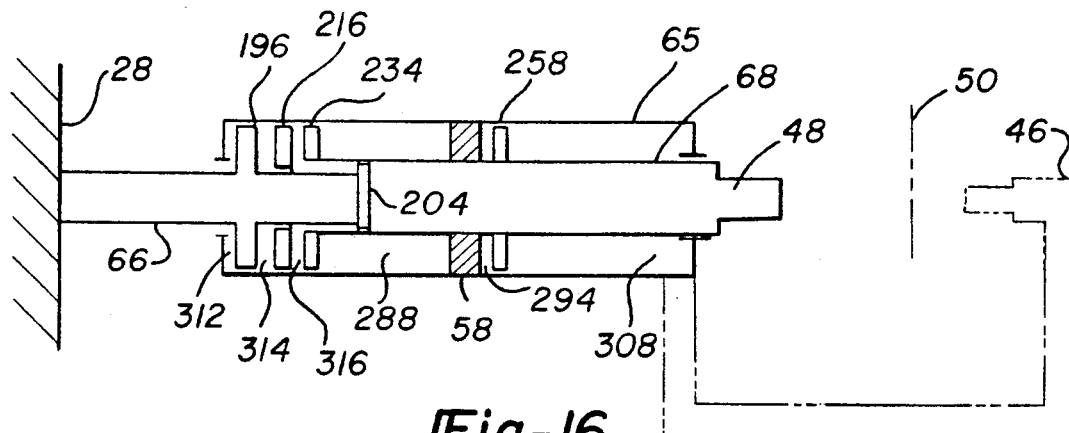
FIG. 16 is a schematic side view of a multiple piston high force generating cylinder with attached electrodes in an open position.

FIG. 16 is a schematic side view of a third embodiment of the present invention which shows a multiple piston high force generating system with the electrodes 46 and 48 in the open position with respect to the workpiece 50. In this concept of the invention, the bulkhead 58 is attached to the external housing 65 to the right of the rear piston 234. The forward piston 258 is attached to the front piston rod 68 between the bulkhead 58 and the right end of the external housing 65. The initial start position is shown in FIG. 16 with the reaction piston 196, the floating piston 216, and the rear piston 234 all to the left in close proximity to the left end of the external housing 65.

Figure 17:
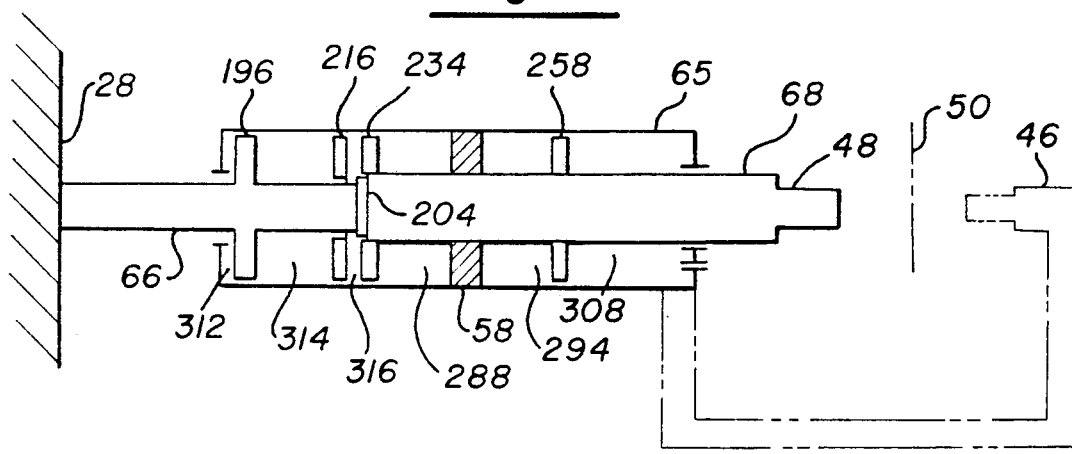
FIG. 17 is a schematic side view similar to that shown in FIG. 16 with the electrodes in an intermediate position.

FIG. 17 is a schematic side view similar to that shown in FIG. 16 except that the electrode 48 has moved to an intermediate position with respect to the workpiece 50. The electrode 48 arrives at its intermediate position by introducing fluid pressure to the chamber 314 causing the floating piston 216 to move to the right, carrying the rear piston 234 to the right. The pressure in the chamber 314 is maintained at this time.

Figure 18:
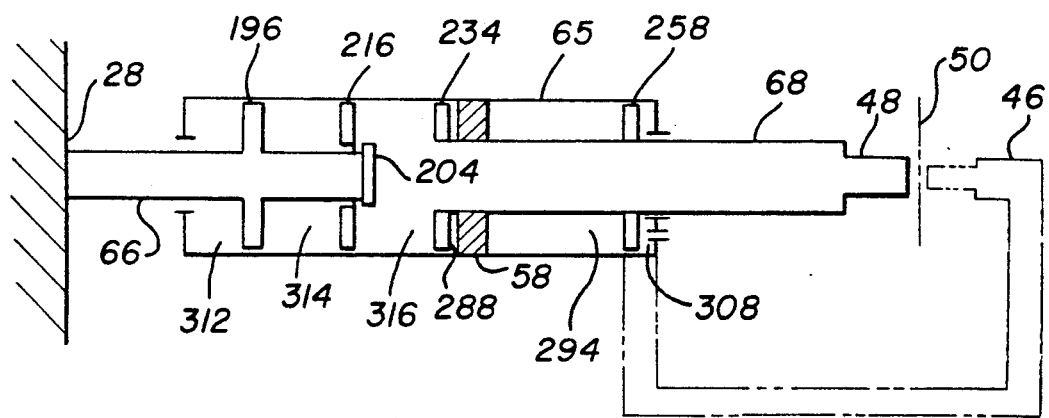
FIG. 18 is a schematic side view similar to that shown in FIGS. 16 and 17 with the electrodes in a closed position.

FIG. 18 is a schematic side view that shows the electrodes 46 and 48 in contact with the workpiece 50. Fluid pressure is then applied to the chambers 312 and 316 as well as the chamber 294. The chambers 316 and 294 can be pressurized from a common source. The force exerted by the electrodes 46 and 48 is increased considerably because of the increase in area provided by the combination of the rear piston 234 and the forward piston 258 acting in unison. During the advancement of the forward piston 258 toward the right the chamber 308 is vented to the atmosphere. The electrodes 46 and 48 are returned to an intermediate or midpoint position by removing the pressure from the chambers 312, 316 and 294 and applying pressure to the chamber 288. The electrodes 46 and 48 are then returned to a full open position by removing the pressure from the chamber 314 and maintaining pressure to the chamber 288.

The pressurizing and venting of the chambers heretofore discussed in describing the operation of the various embodiments of the invention can be accomplished by the utilization of two-way and three-way valves as is readily apparent to those skilled in the art. Additionally, the term fluid pressure has been referred to throughout the discussion. Such terminology applies equally well to liquids such as oil and to gaseous mediums such as air.

While the illustrative embodiment of the invention has been described in considerable detail for the purpose of setting forth practical operative structures whereby the invention may be practiced, it is to be understood that the particular apparatus described is intended to be illustrative only, and that the various novel characteristics of the invention may be incorporated in other structural forms without departing from the spirit and scope of the invention defined in the appended claims.

What is claimed is:

1. An apparatus for moving a work performing tool into and out of engagement with a workpiece, said apparatus comprising:

a support structure;

a fluid driven cylinder mounted to said support structure, said fluid driven cylinder comprising:

an external housing having one end and an opposite end;

a reaction piston rod extending from said one end of said external housing for reciprocable movement relative thereto;

a front piston rod extending from said opposite end of said external housing for reciprocable movement relative thereto; and means for pivotally mounting said reaction piston rod to said support structure, said means for pivotally mounting being interposed said reaction piston and said support structure;

means for pivotally mounting said front piston rod to a second portion of said work performing tool; and means for mounting said external housing of said fluid driven cylinder to a first portion of said work performing tool such that relative movement between said reaction piston rod, said front piston rod and said external housing causes said first and second portions of said work performing tool to move into and out of engagement with said workpiece.

2. The apparatus as claimed in claim 1, wherein said support structure further comprises means for mounting said first portion of said work performing tool to said support structure.

3. The apparatus as claimed in claim 2, wherein said means for mounting said external housing of said fluid driven cylinder to said first portion of said work performing tool further comprises:

a first tool carrying yoke interposed said first portion of said work performing tool and said external housing, said first tool carrying yoke comprising:

one end portion mounted to said external housing;

an opposite end portion mounted to said work performing tool; and an intermediate portion mounted to said means for mounting said first portion of said work performing tool to said support structure;

a second tool carrying yoke having one end mounted to said means for mounting said first portion of said work performing tool to said support structure; and an opposite end mounted to said work performing tool wherein said means for pivotally mounting said front piston rod to said second portion of said work performing tool comprises:

a yoke link having one end portion attached to said second tool carrying yoke;

an opposite end portion attached to said means for mounting said first portion of said work performing tool to said support structure; and an intermediate portion attached to said front piston rod.

4. The apparatus as claimed in claim 2, wherein said means for mounting said first portion of said work performing tool to said support structure further comprises:

a pair of spaced apart side plates;

a first cantilevered support arm mounted to one of said pair of spaced apart side plates;

a second cantilevered support arm mounted to the other of said pair of spaced apart side plates, one of said first and second cantilevered support arms extending from a respective one of said pair of spaced apart side plates and each having an aperture therein, said apertures being axially aligned with each other; and a first pin mounted in said axially aligned apertures of said first and second cantilevered support arms.

5. The apparatus as claimed in claim 3, wherein said means for mounting said first portion of said work performing tool to said support structure further comprises:

a pair of spaced apart side plates;

a first cantilevered support arm mounted to one of said pair of spaced apart side plates;

a second cantilevered support arm mounted to the other of said pair of spaced apart side plates, one of said first and second cantilevered support arms extending from a respective one of said pair of spaced apart side plates and each having an aperture therein, said apertures being axially aligned with each other; and a first pin mounted in said axially aligned apertures of said first and second cantilevered support arms.

6. The apparatus as claimed in claim 5, wherein said intermediate portion of said first tool carrying yoke is mounted in said first pin and further wherein said one end of said second tool carrying yoke is mounted to said first pin.

7. The apparatus as claimed in claim 1, wherein said means for pivotally mounting said reaction piston rod to said support structure further comprises:

a back plate mounted to said support structure, said back plate having a plurality of apertures therein;

said reaction piston rod extending from said one end of said external housing through one of said plurality of apertures in said back plate;

a pivot block mounted to said reaction piston rod and said back plate; and means for attaching said pivot block to said back plate such that as said external housing moves relative to said reaction piston rod, said reaction piston rod pivots with respect to said back plate.

8. The apparatus as claimed in claim 3, wherein said means for pivotally mounting said reaction piston rod to said support structure further comprises:

a back plate mounted to said support structure, said back plate having a plurality of apertures therein;

said reaction piston rod extending from said one end of said external housing through one of said plurality of apertures in said back plate;

a pivot block mounted to said reaction piston rod and said back plate; and means for attaching said pivot block to said back plate such that as said external housing moves relative to said reaction piston rod, said reaction piston rod pivots with respect to said back plate.

9. The apparatus as claimed in claim 4, wherein said means for pivotally mounting said reaction piston rod to said support structure further comprises:

a back plate mounted to said support structure, said back plate having a plurality of apertures therein;

said reaction piston rod extending from said one end of said external housing through one of said plurality of apertures in said back plate;

a pivot block mounted to said reaction piston rod and said back plate; and means for attaching said pivot block to said back plate such that as said external housing moves relative to said reaction piston rod, said reaction piston rod pivots with respect to said back plate.

10. The apparatus as claimed in claim 6, wherein said means for pivotally mounting said reaction piston rod to said support structure further comprises:

a back plate mounted to said support structure, said back plate having a plurality of apertures therein;

said reaction piston rod extending from said one end of said external housing through one of said plurality of apertures in said back plate;

a pivot block mounted to said reaction piston rod and said back plate; and means for attaching said pivot block to said back plate such that as said external housing moves relative to said reaction piston rod, said reaction piston rod pivots with respect to said back plate.

11. The apparatus as claimed in claim 3, wherein said means for pivotally mounting said front piston rod to a second portion of said work performing tool further comprises:

a link interposed said intermediate portion of said yoke link and said front piston rod;

adjustable rod means mounted between said one end portion of said yoke link and said second tool carrying yoke;

means for mounting said adjustable rod means to said second tool carrying yoke and said one end portion of said yoke link.

12. The apparatus as claimed in claim 6, wherein said means for pivotally mounting said front piston rod to a second portion of said work performing tool further comprises:

a link interposed said intermediate portion of said yoke link and said front piston rod;

adjustable rod means mounted between said one end portion of said yoke and link and said second tool carrying yoke;

means for mounting said adjustable rod means to said second tool carrying yoke and said one end portion of said yoke link.

13. The apparatus as claimed in claim 10, wherein said means for pivotally mounting said front piston rod to a second portion of said work performing tool further comprises:

a link interposed said intermediate portion of said yoke link and said front piston rod;

adjustable rod means mounted between said one end portion of said yoke and link and said second tool carrying yoke;

means for mounting said adjustable rod means to said second tool carrying yoke and said one end portion of said yoke link.

14. The apparatus as claimed in claim 3, wherein said first tool carrying yoke is bifurcated with a pair of legs each connected to said external housing of said fluid driven cylinder.

15. The apparatus as claimed in claim 1, wherein said fluid driven cylinder is suspended within said support structure for translation and rotation with respect thereto.

16. The apparatus as claimed in claim 1, further comprising:

a transformer mounted adjacent said fluid driven cylinder;

a pair of shunts, each shunt of said pair of shunts having one end and an opposite end, said one end of said pair of shunts attached to said transformer; said opposite end of one of said pair of shunts attached to said first portion of said work performing tool, said first portion of said work performing tool being a weld electrode; and said opposite end of the other of said pair of shunts attached to said second portion of said work performing tool; said second portion of said work performing tool being a weld electrode; and a source of electrical power attached to said transformer, whereby as said first and second portion of said work performing tool move into engagement with said workpiece said transformer is actuated to supply source of electrical power to said weld electrodes and said workpiece to perform a weld on said workpiece.

17. A fluid driven cylinder having a longitudinally extending axis, said fluid driven cylinder comprising:

a rear cylinder head having an aperture located therethrough;

a front cylinder head having an aperture located therethrough, said front cylinder head spaced a predetermined distance from said rear cylinder head;

a cylinder body attached to and suspended between said front and rear cylinder heads;

a front piston located within said cylinder body, said front piston having a front cylinder face;

a front piston rod attached to said front cylinder face of said front piston, said front piston rod further extending through said aperture of said front cylinder head;

a reaction piston located within said cylinder body between said front piston and said rear cylinder head, said reaction piston having a rear cylinder face;

a rear reaction piston rod attached to said rear cylinder face of said reaction piston, said rear reaction piston rod further extending through said aperture of said rear cylinder head;

a front chamber defined by said front cylinder face of said front piston, a portion of said front piston rod that lies within said cylinder body, and said front cylinder head;

a rear chamber defined by said rear cylinder face of said reaction piston, a portion of said rear reaction piston rod that lies within said cylinder body, and said rear cylinder head;

an intermediate chamber located between said front piston and said reaction piston;

fluid egress and ingress means located in said rear, intermediate and front chambers for communication therewith, whereby fluid under pressure is communicated to said intermediate and rear chambers through said fluid ingress means to move said front piston rod in one direction and said cylinder body in an opposite direction while said reaction piston and its associated rear reaction piston rod remain in a fixed position and said fluid egress means vents said front chamber and whereby further said fluid egress means permits said fluid under pressure in said rear and intermediate chambers to vent while simultaneously fluid under pressure is communicated to said front chamber through said fluid ingress means to move said front piston in said opposite direction and said cylinder body in said one direction while said reaction piston and its associated rear reaction piston rod remain in said fixed position.

18. The fluid driven cylinder as claimed in claim 17, further comprising:
a floating piston having an aperture therein, said floating piston mounted in said cylinder body between said front piston and said reaction piston, said floating piston further being mounted in said intermediate chamber to define a first intermediate chamber between said floating piston and said front piston and a second intermediate chamber between said reaction piston and said floating piston;
said reaction piston further having a front cylinder face opposite said rear cylinder face;
a front reaction piston rod having one end attached to said front cylinder face of said reaction piston and an opposite end extending a predetermined distance from said front cylinder face of said reaction piston, said front reaction piston rod extending through said aperture of said floating piston whereby said floating piston is mounted on said front reaction piston rod for movement relative thereto; and
abutment means on said opposite end of said front reaction piston rod whereby said floating piston moves between said front cylinder face of said reaction piston and said abutment means on said front reaction piston rod.

19. The fluid driven cylinder as claimed in claim 17, further comprising:
a bulkhead mounted in said cylinder body between said front piston and said front cylinder head, said bulkhead having an aperture therein, said front piston rod being mounted in said aperture of said bulkhead and said aperture of said front cylinder head for communication therewith, said bulkhead further dividing said front chamber into a first front chamber located between said bulkhead and said front piston and a second front chamber located between said bulkhead and said front cylinder head;
an intensifier piston located in said cylinder body between said bulkhead and said front cylinder head in said second front chamber, said intensifier piston being rigidly mounted to said front piston rod for movement therewith, said intensifier piston further dividing said second front chamber into a second front chamber located between said intensifier piston and said front cylinder head and an intensifier chamber located between said bulkhead and said intensifier piston.

20. The fluid driven cylinder as claimed in claim 17, further comprising:
a link adapter attached to an end of said front piston rod remote from said reaction piston.

21. The fluid driven cylinder as claimed in claim 18, wherein said floating piston has an apertured impact plate attached thereto.

22. The fluid driven cylinder as claimed in claim 18, further comprising:
a link adapter attached to an end of said front piston rod remote from said reaction piston.

23. The fluid driven cylinder as claimed in claim 17, further comprising means for attaching said rear cylinder head, said front cylinder head, and said cylinder body to each other.

24. The fluid driven cylinder as claimed in claim 18, further comprising means for attaching said rear cylinder head, said front cylinder head, and said cylinder body to each other.

25. The fluid driven cylinder as claimed in claim 17, further comprising attachment means coupled to said front cylinder head.

26. The fluid driven cylinder as claimed in claim 18, further comprising attachment means coupled to said front cylinder head.

27. The fluid driven cylinder as claimed in claim 25, wherein said attachment means comprises a pair of spaced apart clevises mounted to said front cylinder head.

28. The fluid driven cylinder as claimed in claim 26, wherein said attachment means comprises a pair of spaced apart clevises mounted to said front cylinder head.

29. A method for moving a work performing tool into engagement with a workpiece, said method comprising the steps of:
positioning said workpiece between a first portion and a second portion of said work performing tool while said first and second portions are in first and second open positions, respectively;
stroking an external housing of said work performing tool in a first direction so as to move said first portion of said work performing tool toward and into engagement with said workpiece; and
stroking a front piston rod reciprocably extending from said external housing in an opposite direction from said first direction so as to move said second portion of said work performing tool toward and into engagement with said workpiece to clamp said workpiece between said first and second portion of said work performing tool.

30. The method as claimed in claim 29, wherein said steps of stroking said external housing and stroking said front piston rod hydraulically lock said first and second portions in engagement with said workpiece.

31. The method as claimed in claim 29, further comprising the steps of:
performing work on said workpiece;
stroking said external housing in said opposite direction so as to move said first portion away from said workpiece and toward said first open position; and
stroking said front piston rod in said first direction so as to move said second portion away from said workpiece and toward said second open position.

32. The method as claimed in claim 31, wherein said steps of stroking said external housing and stroking said front piston rod hydraulically lock said first and second portions in said first and second open positions, respectively.

33. A method for moving a work performing tool into engagement with a workpiece, said method comprising the steps of:
positioning said workpiece between a first portion and a second portion of said work performing tool while said first and second portions are in first and second open positions, respectively;
stroking a front piston rod reciprocably extending from an external housing of said work performing tool in a first direction so as to move said second portion to an intermediate position toward said workpiece;

stroking said external housing in an opposite direction from said first direction so as to move said first portion toward and into engagement with said workpiece; and further stroking said front piston rod in said first direction so as to move said second portion into engagement with said workpiece.

34. The method as claimed in claim 33, wherein said step of stroking said front piston rod hydraulically locks said second portion in said intermediate position.

35. The method as claimed in claim 33, further comprising the steps of:

performing work on said workpiece;

stroking said front piston rod in said opposite direction so as to move said second portion to said intermediate position and out of engagement with said workpiece; and stroking said external housing in said first direction so as to move said first portion toward said first open position and out of engagement with said workpiece.

36. The method as claimed in claim 35, wherein said step of stroking said front piston rod in said opposite direction hydraulically locks said second portion in said intermediate position.

37. The method as claimed in claim 33, wherein said steps of stroking said external housing and further stroking said front piston rod occur simultaneously.

38. The method as claimed in claim 33, wherein said step of further stroking said front piston rod includes applying an intensifying force on said front piston rod for intensifying engagement of said first and second portions with said workpiece.

* * * * *

UNITED STATES PATENT AND TRADEMARK OFFICE
CERTIFICATE OF CORRECTION

PATENT NO. : 5,177,337
DATED : January 5, 1993
INVENTOR(S) : Allan Ward

It is certified that error appears in the above-identified patent and that said Letters Patent is hereby corrected as shown below:

```
Column 7, line 2, before "rod" insert ---- piston ----.

Column 7, line 50, delete "head" and insert ---- heads ----.

Column 8, line 67, delete "busing" and insert ---- bushing ----.

Column 10, line 19, delete "placed" and insert ---- place ----.

Column 13, line 24, after "piston" insert ---- rod ----.

Column 15, line 32, after "yoke;" insert ---- and ----.

Column 15, line 44, after "yoke;" insert ---- and ----.

Column 15, line 56, after "yoke;" insert ---- and ----.

Column 16, line 20, after "supply" insert ---- said ----.
```

Signed and Sealed this

Second Day of November, 1993

Attest:

BRUCE LEHMAN

*Attesting Officer*     *Commissioner of Patents and Trademarks*